March 25, 1947.  O. G. CARPENTER, SR  2,418,067
CAMERA AND LIGHT SUPPORT
Filed Feb. 8, 1946  4 Sheets-Sheet 1
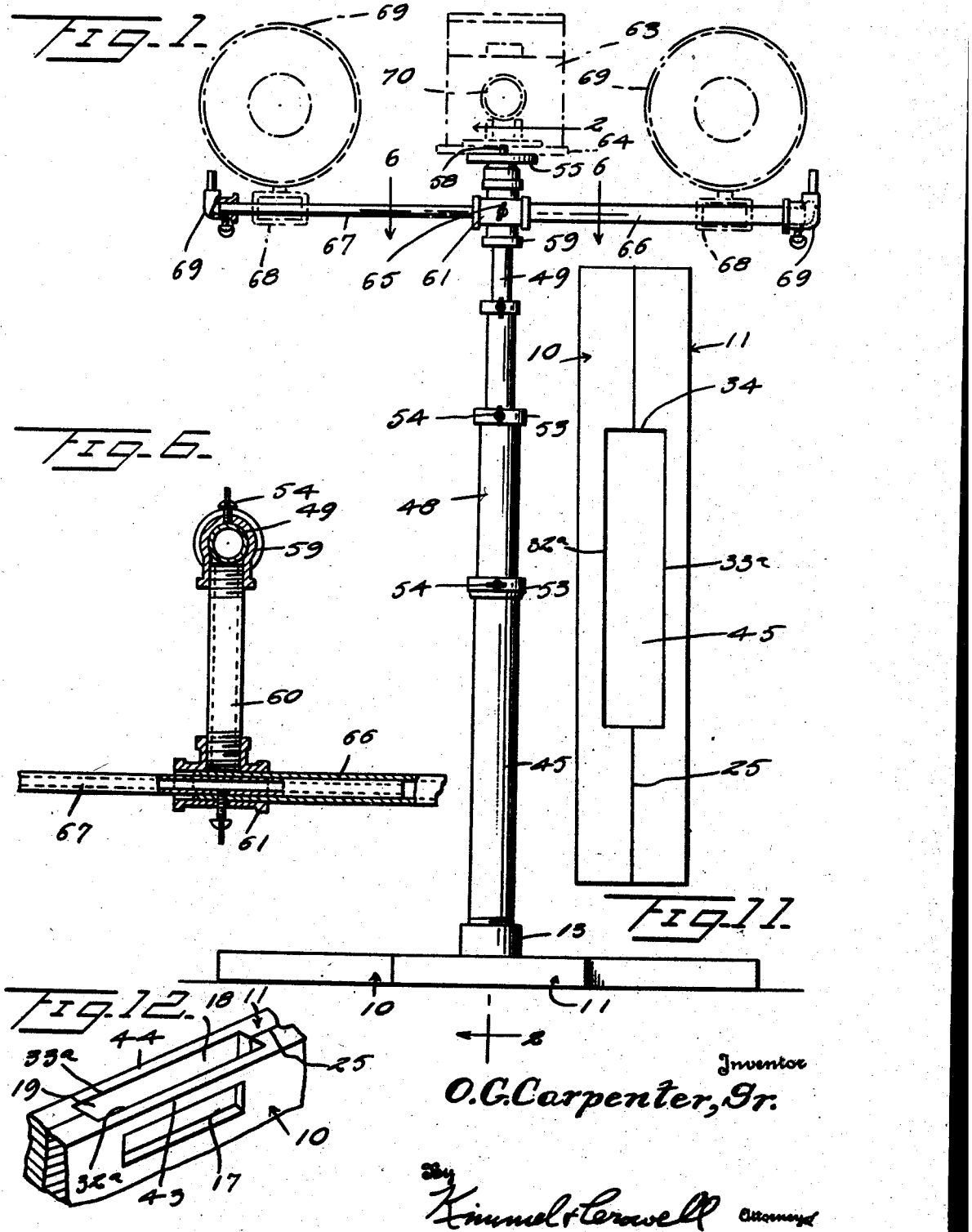
Inventor
O. G. Carpenter, Sr.

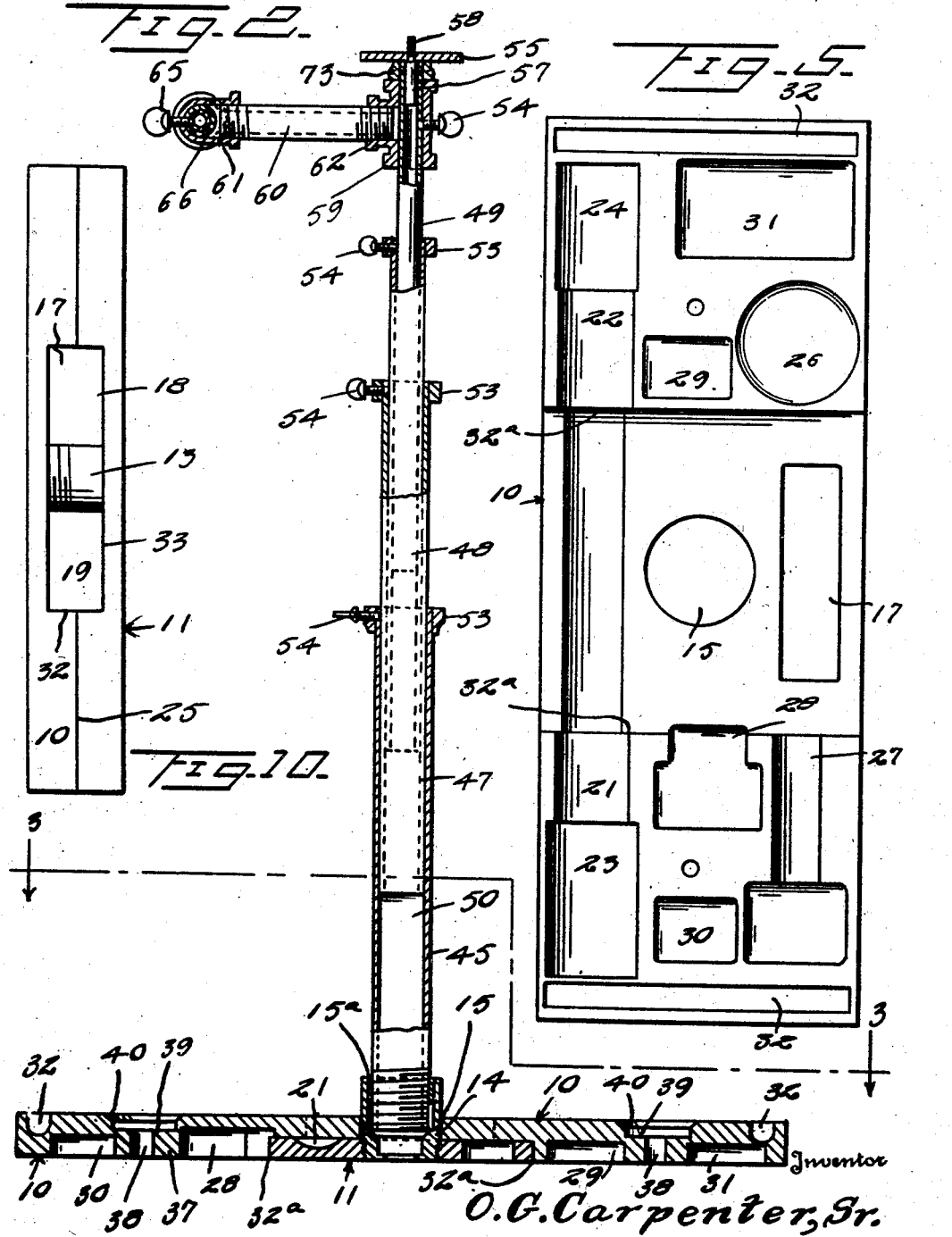

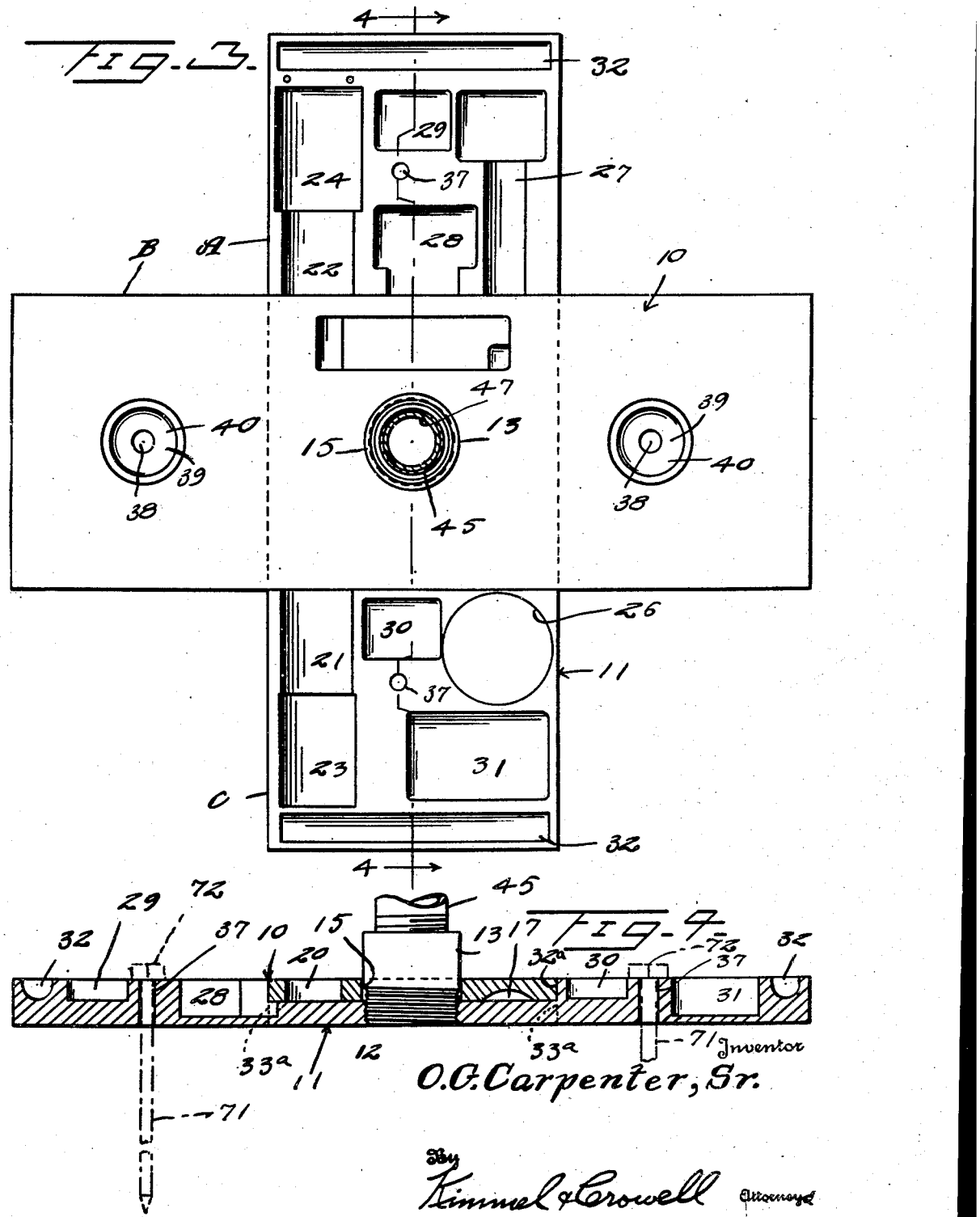

March 25, 1947.  O. G. CARPENTER, SR  2,418,067
CAMERA AND LIGHT SUPPORT
Filed Feb. 8, 1946   4 Sheets-Sheet 4
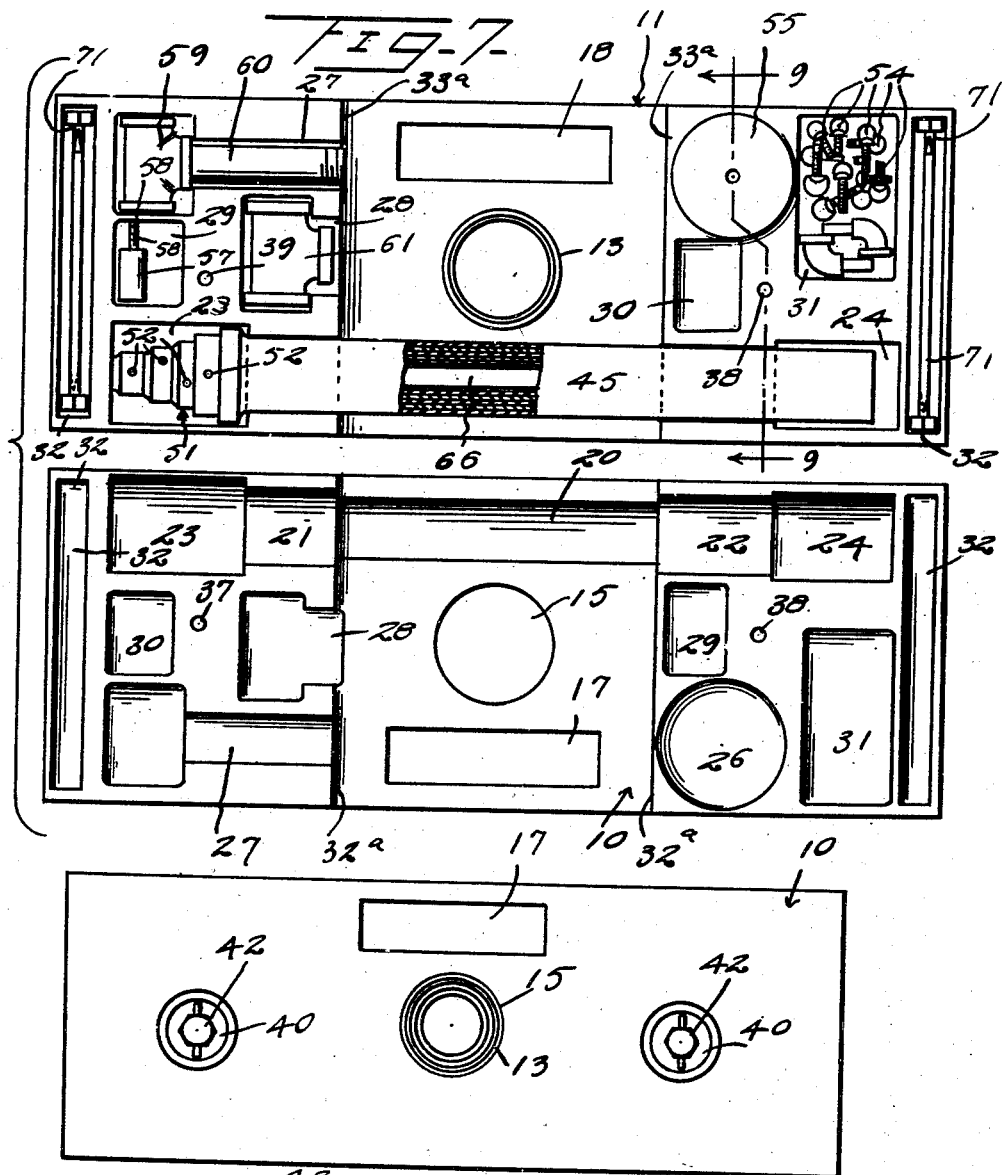
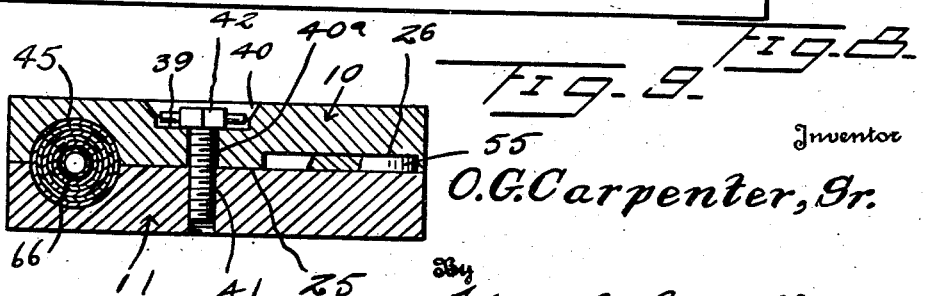
Inventor
O. G. Carpenter, Sr.
By
Kimmel & Crowell  Attorneys Patented Mar. 25, 1947

2,418,067

UNITED STATES PATENT OFFICE 2,418,067

CAMERA AND LIGHT SUPPORT

Owen Griffith Carpenter, Sr., Pelham, N. Y.

Application February 8, 1946, Serial No. 646,261

12 Claims. (Cl. 248—161)

The present invention relates to improvements in photographer's apparatus and more particularly to means for setting up and encasing for portability supporting parts for the camera and/or lights.

One of the objects thereof is to provide a light, strong, rigid and compact box which may be conveniently carried about from place to place, readily opened for removal of its contents, manipulated for positioning it rigidly so as to support and center a camera and/or lights by aid of said contents, and maintained as well as equipped in camera-height varying relationship.

Another object thereof is to provide a suitable case with suitable cavities for receiving, holding as well as concealing the various component parts making up the camera and/or lights supporting means.

A further object thereof is to provide a narrow, rectangular flat-sided case so shaped, manipulated and controlled that it may perform the dual service of encasing the camera and/or lights, supporting means as well as provide a rigid base member upon which said means may be detachably and firmly anchored.

A still further object thereof is to provide a sectional, portable carrying case for photographer's camera and/or lights setting up mechanism or equipment in such a form and in such a manner that, instead of employing a tripod as the means for centering the camera firmly upon the ground or other under surface or support a unitary post is employed serviceably and conveniently.

Another object thereof is to provide such a formation and operation of and for camera and/or lights, setting up mechanism, or means, as will effectively and rigidly mount the same upon its supporting surface when in use, permit the same to be collapsed into knockdown assembly, and permit instant conversion of the base portion thereof into a box designated to receive and removably contain concealedly therein said mechanism or means so that no part thereof is extraneous thereto.

Another object thereof is to provide, a device of the kind described, means for giving instant accessibility to the contents of the carrying case.

A still further object thereof is to provide, in a device of the kind described, means for varying the angular relationship of the box sections for the purpose, not only of making one section rigidly brace the other section, but also for the purpose of amplifying the area of the sections when it serves as a base member for the camera and/or lights erecting and supporting means.

Another object of the invention is to provide in a device of the kind described, means for varying the length of the camera supporting means with respect to its base member or anchoring means, for the purpose of holding the camera and/or lights at different levels.

A further object thereof is to provide, in a device of the character described, means for juxtaposing the base member forming sections of the box is such in a manner in flat contact with its under surface that whether same is to be mounted upon a floor, or outside of a building, upon the ground, the camera and/or lights erecting and holding means will have sufficient spread upon its under supporting surface as well as adequate purchase thereupon as will best conduce to position it in a rigidly mounted manner.

A final object thereof, is to provide, in a device of the kind described, non-projecting surfaces shaped in a manner to provide handle grips by means of which the photographer is able to conveniently hold and carry about with him the present invention.

With the above and other objects in view my invention consists in the combination, arrangement and details of construction disclosed in the drawings and specifications, and then more particularly pointed out in the appended claims.

In the drawings—

Figure 1 is an elevation of my invention, in set-up position,

Figure 2 is a sectional elevation of my invention, in set-up position,

Figure 3 is a plan view of my invention confined to showing the qualified position of the sections of the carrying case, some parts being in section also showing position of the case for the base, Figure 4 illustrates longitudinal sectional views of the parts of Figure 3, Figure 5 is a top plan view of one of the box sections or covers, which also serves as half of the base, Figure 6 is a sectional top plan view of a part of the camera and/or lights setting up means, Figure 7 is a view coupling together for comparative inspection the complemental sections of the carrying case and base, Figure 8 is a plan view of the carrying case and base, Figure 9 is a cross section of the carrying case with camera and/or lights supporting means encased, Figure 10 is a view of one side of the carrying case and base, Figure 11 is a view of the other side of the carrying case and base, and Figure 12 is a perspective view of the carrying case and base.

Referring to the drawings, which are merely illustrative of my invention, the various parts thereof are detailed. The completed invention with parts assembled relative to each other, is seen in Figure 12. This shows the carryig case and base composed of a pair of symmetrical, similarly sized box sections 10 and 11, made from any suitable material, such as metal, plastics, or other composition or composite substance, the requisite being that the case and base be made light and strong with all walls thereof rigid. It is proposed to provide a rectangular, materially narrow carrying case and to this end, both sections are very narrow and rectangular in contour, having flat sides that are adapted to abut, as shown in Figures 9 and 12 respectively.

Box section 11 (Figure 4) is formed with a threaded cylindrical bore 12, into which is threaded a nipple 13, in such a way that its outer end is flush with the adjacent side of this section and the other end of the nipple projects above the section a short distance, threads 14 being formed on the nipple for this end. Nipple should be flush on both sides of case.

Inside of the nipple may be formed an annular shoulder 15a if desired. The other box section 10 has a central cylindrical hole 15 adapted to register with the nipple so the nipple may project snugly therethrough and be reinforced thereby. The sections 10 and 11 are formed with registerable elongated rectangular slots 17 and 18, centrally of the sections, and closely contiguous to one common longitudinal edge of the sections, as shown in Figure 12. Between the longitudinally separated ends of the carrying case and base and the ends of the slots 17, 18 are transverse portions 75 and 76 of the case which serve as end housings therefor, while the longitudinal marginal portion 74 of the case remote from the longitudinal edge opposite which the slots 17, 18 are formed, also serves as a longitudinal housing for the device.

In this longitudinal housing section 74 is formed, upon each section of the box, complementarily, centrally thereof, elongated straight grooves 20, concave in cross-section, designed to register when the sections are held in closing abutting relation. Each groove 20 is formed at opposite ends with half sockets 21, 22, also concave in cross section, which terminate at the ends of the box in half sockets 23, 24, also concave in cross section. The abutting sides of the sections are designated 25. Formed in one transverse housing portion 75 of the box, in each section 10, 11 thereof, is a disk receiving cavity 26, cylindrical in contour. A T-shaped half socket 27, of large size, and another T-shaped half socket 28 of small size are formed alongside each other in the opposite transverse housing portion 76 of the box.

Rectangular half sockets 29 and 30 are also formed in both sections 10, 11 of the carrying case and base, being located respectively in both housing end portions thereof 75 and 76, being located between the disk receiving half socket 26, and the adjacent cavity ends 21, 22 of the elongated grooves 20. A larger rectangular socket 31 may also be formed in the end housing portion 75 of the case, being located in back of the disk-shaped cavity 26 thereof.

Formed centrally upon the box sections 10 and 11 are centrally located channeled out portions, shaped rectangular in contour, which are dovetail portions 33a where formed upon section 11, and 32a where formed upon section 10. These channels are substantially square in cross section, as is seen from Figure 7. There is a hole 37, 38 formed respectively upon sections 10 and 11, being located in the end housing portions 75, 76 of the box.

There is also formed at the opposite ends of the case or carrying case cylindrical cavities 40 having annular counterseats 39 formed therein. From Figure 9 it is seen that these cavities are formed with bores 40a opening out of the other side of the box section 10, and that the other box section 11 is formed with a bore 40b to register with each bore 40a. When the box sections register, as shown in Figures 9 and 12, screw bolts 41 are threaded into the threads of bores 40a, 40b of the two sections, being manipulated by the wing heads 42 formed upon these bolts. It is seen that when bolts 41 are screwed fully home, the wing heads thereof lie snugly in cavities 40 so as to be submerged therein.

The camera and/or lights supporting post of the device is composed of a plurality of telescoping nested separate tubes or tube sections designated respectively 47, 48, 49, having hollow bores 50 each, and being of varying diameters so that one fits into the other extensibly. The outermost tube of all nested tubes is designated 45, and has its threaded end 46 adapted to be screwed home into the nipple 13. The graduated lengths of all nested telescoping tubes is best seen at 51 in Figure 7. At one end of each tube is fitted a ring or flange 53, in each of which a hole 52 is formed. Set screws or wing screws 54 are employed to hold the telescoping tubes in extended relation. A disk is designated 55 and lies in disk cavities 26. It has a central threaded hole 56. The disc serves as a platform for the case.

At each of the opposite ends of the box sections 10 and 11 are formed transversely thereof, grooves of narrow width 32. A rod 57 is provided which terminates in a reduced stem 58. A large T-coupling or union 59 is provided having the pipe stem 60 threaded thereinto. A short T-coupling or union 61 is also provided. The lateral stem of coupling 59 is designated 62. A camera 63 has its flat base designated 64. A pair of spikes 71 are provided having heads 72.

In operation the device functions in the following way: The collapsed post, having all contained tubes nested is shown located with its outermost tube 45 located in elongated cavities 20, 24, of the box sections and with its abutting flanged out end received into cavities 24 in said sections. The tie bolts or spikes 71 fit into cavities 32. The large T-coupling fits in cavities 27. The small one is accommodated in cavities 32. The rod 57 lies in cavities 29. In the remaining activities may be located the thumb bolts and other connections employed in setting up the camera and lights. When section 11 is surmounted upon section 10, so that their flat sides, are in abutment, it will be found that all cavities holding the parts of the setting-up means for the camera, are snugly encased in housings, so that they cannot escape from the carrying case when it is being carried about after screwing home the screw bolts 41 in both of the sections to clamp them detachably together.

When it is desired to apply operatively the setting up means upon the box sections the procedure is as follows: As seen in Figure 3, the channeled out portions of both sections are placed together in an accurate dovetail butt fit so the opposing walls of each channel contacts the opposing longitudinal edges of the opposite sections. In this way the top surfaces of both sections are disposed in flush relationship, while both sections intersect each other and assume a cruciform contour, so that four right angularly spaced apart arms of a rigid base member is had, at A, B, C and D. The contents of the sections having been removed therefrom, the various tubes constituting the post, are now assembled so that they are all pulled out of their encasing tubes the proper distance, once the proper height of the post is determined. Thereupon, the thumb screws 54 are all tightened so that the extended tubes may be locked in adjusted position as shown in Figure 1, and Figure 2. The lower end of the lowermost tube 45 will be threaded rigidly and firmly anchored into the nipple 13, of the cruciform base member. The rod 57 is then taken and slid into the interior of the uppermost part of the post, which is the coupling 59, after being slipped through the bore of a collar 73 which rests upon the top edge of this coupling. The disk 55 will then be screwed home upon the reduced stem 58 of this rod so it rests upon the collar 73. Thereupon, the conventional camera may have its base portion 64 surmounted upon the disk, and turned so the threaded stem 58 of the rod may be screw threaded into the threaded hole in this camera base portion. The camera is now properly centered at the upper end of the post.

Next two blast lamps or the like may, by means of their sleeves 68 or the like be adjustably mounted upon a supporting means now to be described. The lateral stem 62 of the coupling 59, carries the pipe section 60, and threadedly engaged upon the outer end of the latter is the small T-coupling 61 into which is slidably mounted for adjustment a tube 66 into which is adjustably telescoped a rod 67. The clamping thumb screw 65 locks the rod 66 in adjusted position. In this manner it will be seen that the tubular rod 66 extends in one direction with respect to the camera while the rod 67 extends in an opposite direction thereto while both rods are disposed in back of the camera which they straddle.

This is shown in Figure 1. The photographic apparatus may now be caused to function to take photographs. The lamps may, of course, easily be adjusted upon the rods or cross rod. When all parts are dismounted and replaced into the box or carrying case, in the manner already explained, the two sections 10, 11 thereof may be clamped together by means of the screws 41 which engage both of them so that the thumb heads thereof are countersunk in the section 10, and so that nothing contained in the box is extraneous thereto. The operator then inserts his fingers into both rectangular slots 17, 18 of the case, and engages the hand grips 43, 44 and thereby is able to carry the case about with him.

What I claim is:

1. A device, as described consisting of a cross shaped base member, a post rising rigidly therefrom centrally, a tubular mounting at the upper end of said post, a disk seated upon said tubular mounting and formed with a central threaded hole, a rod mounted removably in said tubular member having a reduced threaded stem threaded projectingly into said disk so as to extend thereabove, and lamp carrying means carried by said post at its uppermost end.

2. A device as described consisting of a cruciform rigid base, a post rigidly extending upwardly therefrom centrally, a T-coupling attached to said post at its upper end, a tube having one end attached to said coupling, means extending into said coupling coaxially thereof for anchoring a camera thereupon, a T-coupling carried by the other end of said tube, a cross rod mounted in the last-named T-coupling, means clamping said cross rod into the mentioned coupling, and lamp supporting means carried by said cross rod.

3. A device of the kind described consisting of a two section body or case of rigid construction, means removably attaching them in abutting relationship, the two sections being formed centrally with registering longitudinal rectangular slots adjacent to the margins thereof so as to provide between the said margins of the sections and the adjacent edges of said slots a carrying handle.

4. As a new article of manufacture a two-section rigid box, each section being of hollow interior, means for removably clamping said sections together, in flat contacting relation, each of said sections being formed with registering elongated slots centrally thereof and adjacent to one common marginal edge of both sections so that there is formed a relatively thin longitudinal hand hold for the fingers of a person's hand inserted through both of said slots.

5. As a new article of manufacture a pair of similarly sized rigid box sections, each section having a transverse channel formed centrally thereof, each channel having oppositely arranged parallel shoulders such that one section, when disposed in intersecting relation to the other section and at right angles thereto may have the bottom of its channel nested in the bottom of the channel of the other section so that the top of the first section is flush with the top of the other section and whereby both sections have a cruciform contour, and whereby the opposing shoulders of the channel of the second section abut the opposing longitudinal edges of the first section, a post centering means carried by the upper section of the cruciform set, and means for removably attaching both sections in longitudinal alignment with said means concealed therein.

6. A device as described consisting of a pair of rigid box sections of the same size, having complemental elongated grooves, concave in cross section for receiving in removable relation a series of longitudinally nested tubes as well as for receiving fastening elements for locking the tubes, one onto the other, in extendable relation when the nested tubes are removed from the box to form a post, the relation between the box sections being such that when they are in flat surmounted position said nested tubes and fastener elements are completely and concealedly enclosed by them, a nipple projecting upwardly and centrally from one section, the other section having a central registering hole for said nipple, such that, said post made from said nested tubes may have its lower end attached rigidly into said nipple and project through said hole and be vertically disposed with respect to both sections when the box lies on its back.

7. A device of the kind described consisting of a pair of box sections, a post removably anchorable into one box section, and composed of nestable sections, means nesting the post carrying section into the other box section in intersecting right angular relation to provide a cruciform base member for said post, said box sections having complemental grooves so disposed that when they register upon surmounting longitudinally one box section onto the other, they may receive and concealedly enclose the nested post, and means for removably attaching both box sections together in their last named positions.

8. A device of the kind described consisting of a pair of box sections of rigid construction, said sections being centrally channeled out transversely, the grooves having right angular oppositely arranged walls, the right angular walls of one section adapted to abuttingly straddle opposing longitudinal edges of the other section in a plane with the channels of both sections so that the right angular walls of the other section abuttingly straddle the longitudinal edges of the first section, whereby the sections are inter-nested in cruciform relation with the top surfaces flush to provide a rigid base member, a unitary structure of internested tube sections of varying diameters adapted in one box section position to be encased in both sections concealedly, and in the cruciform relation of the sections adapted to be anchored into them rigidly and removably with the nested tubes extended adjustably to provide a post, means also encased in said box sections for locking the extended post tubes in post-setting-up position, and means for detachably clamping together the two box sections against the contents thereof.

9. A device of the kind described consisting of a pair of complemental box sections of narrow formation, and of similar size, being channelled out centrally and transversely, so the channelled parts may be nested together overlappingly to present a commonly flush top surface for both sections when they inter-nest each other in cruciform relation whereby a rigid base member is had, but when said sections are placed in flat abutting contact in registration with each other the channels will also register and provide a rectangular slot extending through the cross section of the box, said sections also being slotted longitudinally and centrally so as to communicate with said rectangular slot, so that marginal surfaces of both sections lie contiguous to said communicating slots and are flanked by said rectangular slot so that slender handles are formed upon said sections, for carrying said box, and means for removably attaching said sections together in abutting flat contact.

10. A device as described consisting of a sectional flat-sided rectangular box, shaped to provide a carrying handle, marginally thereof, as well as shaped so as to position one section intersectingly of the other in surmounted cruciform relation with the adjacent surfaces of both sections flush, a sectional length reducible post, means whereby said post is removably anchored into said sections when the box lies upon one of its sides, means whereby said post, when reduced in length therefor, is concealedly encased between and in both box sections when they register in box formation, and means for removably attaching both box sections together in the latter relationship.

11. A device of the kind described consisting of a pair of symmetrical box sections of narrow width, said sections having flat abutting sides when in box formation, means for detachably clamping the abutting sides together, said sections being formed centrally adjacent to one longitudinal edge thereof with a common elongated slot to provide marginally of the slot handle grips for carrying said box, one section being formed centrally between the ends of the slot with a threaded hole and the other section having a hole centrally thereof which registers with the threaded hole, said sections being formed longitudinally adjacent to the other longitudinal edge thereof with complemental grooves formed concave in cross section for receiving and holding therein concealedly a length extensible post adapted to be threadedly inserted rigidly into the threaded hole of one section and the registering hole of the other section.

12. A device as described consisting of a pair of registering box sections of rectangular shape and with flat abutting sides, having provision for being dove-tailed in surmounted cruciform relation to form a rigid base member, said sections complementally encasing a camera supporting post in knock down manner together with the connections and joints thereof and therefor, means for extensibly lengthening said post, means formed on said sections providing handle grips therefor for carrying it about.

OWEN GRIFFITH CARPENTER, Sr.

REFERENCES CITED

The following references are of record in the file of this patent:

UNITED STATES PATENTS

| Number | Name | Date |
|---|---|---|
| 1,107,075 | Karges | Aug. 11, 1914 |
| 1,754,766 | Phillips | Apr. 15, 1930 |
| 1,878,320 | Potter | Sept. 20, 1932 |